REGENERATIVE TELEGRAPH REPEATER

Filed Oct. 4, 1966 5 Sheets-Sheet 1

REGENERATIVE TELEGRAPH REPEATER

Oct. 28, 1969 HIROSHI SASAKI ET AL 3,475,556

REGENERATIVE TELEGRAPH REPEATER

Filed Oct. 4, 1966 5 Sheets-Sheet 4

3,475,556
REGENERATIVE TELEGRAPH REPEATER

Hiroshi Sasaki, Houya-machi, Kitatama-gun, and Tatsuo Maruyama, Hiratsuka-shi, Japan, assignors to Kokusai Denshin Denwa Kabushiki Kaisha, Tokyo-to, Japan, a Japanese joint-stock company Filed Oct. 4, 1966, Ser. No. 584,246
Claims priority, application Japan, Oct. 8, 1965, 40/61,391
Int. Cl. H04l 25/20, 25/52
U.S. Cl. 178—70 7 Claims

ABSTRACT OF THE DISCLOSURE

A regenerative telegraph repeater for regenerating transmitted telegraph signals by detecting the polarities of successive telegraph signals by use of sampling pulses generated throughout a predetermined interval in response to a characteristic instant of the transmitted telegraph signals, the scale of means for counting the number of the sampling pulses being switched so that the value of the scale is equal to the number N of units of the transmitted telegraph signals in the case of the detection of a mark-to-space characteristic instant and is equal to the number N$a$ less than the number N in the case of the detection of a space-to-mark characteristic instant, thereby regenerating correctly control signals of telegraph switching systems as well as start-stop telegraph signals.

This invention relates to a regenerative telegraph repeater and more particularly to a regenerative repeater employed for teleprinter service in which a telegraph switching system or systems may be included.

Telegraph signals are generally affected by noise and amplitude/frequency and phase/frequency characteristics of the transmission frequency band when the telegraph signals are transmitted through a transmission medium, so that the telegraph signals transmitted have telegraph distortion with respect to their characteristic (significant) instant, such as characteristic distortion, bias distortion and fortuitous distortion. In cases where a value of the telegraph distortion is less than a value of allowable margin of a receiving apparatus, such as a teleprinter, the receiving apparatus can correctly receive the transmitted telegraph signal. If the value of the telegraph distortion is more than the value of allowable margin of the receiving apparatus, however, the transmitted telegraph signals will be erroneously received by the receiving apparatus. To avoid such erroneous receiving of the transmitted telegraph signals, there have been heretofore proposed various kinds of regenerative telegraph repeaters.

The conventional regenerative telegraph repeater has generally a function for regenerating the transmitted telegraph signal as a telegraph signal which is synchronous, with a certain delay time, with the transmitted telegraph signal and has no telegraph distortion with respect to its characteristic instants. If the regenerative telegraph repeater is inserted at the middle point of a section of the transmission medium, while a telegraph signal transmitted from a sending side is affected, through one-half section of the transmission medium, so as to include telegraph distortion, the telegraph distortion is eliminated by the regenerative telegraph repeater and the telegraph signal regenerated is retransmitted. As a result of these operations, the telegraph signal received at a receiving side has telegraph distortion which is affected through the remaining half section only of the transmitted medium. A value of the telegraph distortion of this case is substantially equal to half a value of telegraph distortion which will be given into the telegraph signal in the case of no use of the regenerative telegraph repeater. When the telegraph distortion of the transmitted telegraph signal comes to have a value less than the allowable margin of the receiving apparatus, the receiving apparatus may correctly receive the transmitted telegraph signal. If the value of the telegraph distortion included into the transmitted telegraph signal is more than the allowable margin of the receiving apparatus in spite of employment of a single regenerative telegraph repeater, a plurality of regenerative telegraph repeaters may be inserted into appropriate sections of the transmission medium so that the value of the telegraph distortion of the transmitted telegraph signal is less than the allowable margin of the receiving apparatus. As mentioned above, the regenerative telegraph repeater is a useful apparatus to improve the quality of the transmitted telegraph signal if the regenerative telegraph repeater has an ability to effectively eliminate telegraph distortion of all the telegraph signals transmitted through a transmission medium into which the regenerative telegraph repeater is to be inserted.

The telegraph circuits (the transmission medium) may be classified into two groups. One is a group of point-to-point (fixed) telegraph circuits through each of which a sending apparatus is directly interconnected to a receiving apparatus to transmit an $n$-unit start-stop telegraph signal (an $n$-unit telegraph signal in start-stop system); where "$n$" is a predetermined number of unit-signals of a telegraphic code word such as "7" or "7.5." The other group comprises telegraph exchange networks (switched telecommunication networks) in which a plurality of sending apparatuses may be indirectly connected, through at least one telegraph switching system, to a plurality of receiving apparatuses respectively. Control signals of the telegraph switching systems are included in the telegraph signals transmitted through said telegraph exchange networks as well as start-stop telegraph signals.

The conventional regenerative telegraph repeaters are designed so as to be inserted into the former group of the telegraph circuits, so that they have an ability to regenerate start-stop telegraph signals only. Accordingly, if the conventional regenerative telegraph repeaters are inserted into the telegraph circuits included into the later group, they have such disadvantage that control signals which have different formation from start-stop telegraph signals are erroneously regenerated while the start-stop telegraph signals can be correctly regenerated.

An object of this invention is to provide a regenerative telegraph repeater capable of regenerating correctly control signals of telegraph switching systems as well as start-stop telegraph signals.

Said object and other objects of this invention can be attained by a regenerative telegraph repeater of this invention; comprising a first detector for detecting a mark (Z)-to-space (A) characteristic instant of a transmitted signal; a second detector for detecting a space (A)-to-mark (Z) characteristic instant of the transmitted signal; a sampling pulse generator for generating a sampling pulse train when the first detector or the second detector detects said characteristic instants, the pulse train being composed of sampling pulses which are successively delayed, by successive odd number multiples of one-half of the duration of a standard unit-signal of the transmitted telegraph signals, from the detected characteristic instant; means for suppressing the detection operation of both of the first and second detectors in an interval in which the pulse train is generated; counting means which counts the number of sampling pulses and produces a carry pulse when the counting state thereof reaches a predetermined value; means for stopping pulse generation of the sampling means when the counting means produces the carry pulse; means for switching the scale of the counting means so that the value of the scale is equal to the number N of units of the transmitted telegraph signals in the case of said detection of a (Z)-to-(A) characteristic instant carried out by the first detector and is equal to the number N*a* in case of said detection of an (A)-to-(Z) characteristic instant carried out by the second detector, the number N*a* being an integral number less than the number N; a sampler for sampling the transmitted telegraph signal by the use of the sampling pulse train; and a bistable circuit set by a mark (Z) polarity pulse sampled by the sampler and reset by a space (A) polarity pulse sampled by the sampler.

The novel features of this invention are set forth with particularity in the appended claims, however this invention, as to its construction and operation together with other objects and advantages thereof, may best be understood by reference to the following description, taken in connection with the accompanying drawings, in which the same parts are designated by the same characters, numerals and symbols, and in which:

To make the difference between the conventional regenerative telegraph repeater and the regenerative telegraph repeater of this invention clear, the constitution and operation of the conventional regenerative telegraph repeater will be first described.

Figure 1:
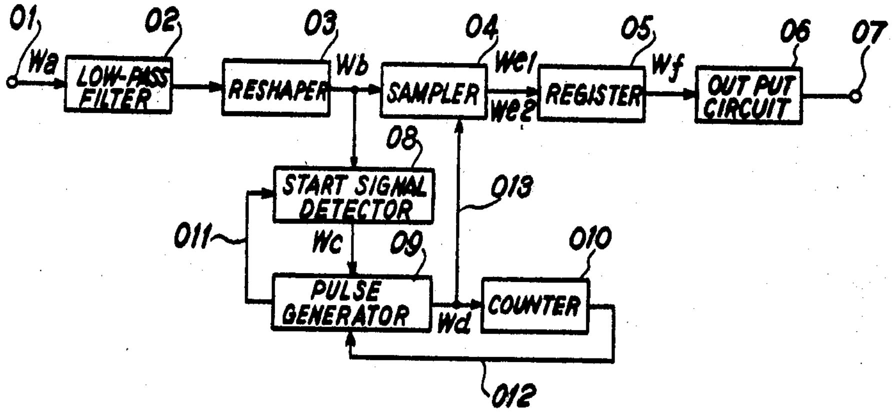
FIG. 1 is a block diagram illustrating a conventional regenerative telegraph repeater.
Figure 2:
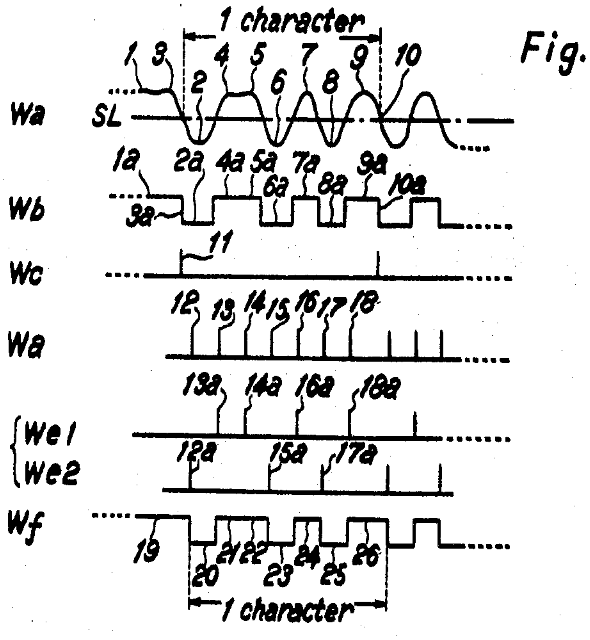
FIGS. 2, 3 and 4 are wave form diagrams for describing the operation of the repeater shown in FIG. 1.

As shown in FIG. 1, the conventional regenerative telegraph repeater comprises as an input terminal 01, a low-pass filter 02, a reshaper 03, a sampler 04, a regenerative register 05, an output circuit 06, an output terminal 07, a start signal detector 08, a sampling pulse generator 09 and a counter 010. Referring to FIG. 2, the operation of the conventional regenerative telegraph repeater of FIG. 1 is described. In a 7.5 unit start-stop telegraph signal W*a* shown in FIG. 2, a characteristic instant 3 from a marking stop-signal 1 to a spacing start-signal 2 is representative of a start instant of a character (a signal of the start-stop system), and five alphabetic signals 4, 5, 6, 7 and 8 of "mark" or "space" follows the start-signal 2, a stop-signal 9 indicating an end of the character. In FIG. 2, the alphabetic signals 4, 5 and 7 and the stop-signal 9 are "mark" and the start-signal 2 and the alphabetic signals 6 and 8 are "space." A succeeding character starts from a characteristic instant 10 from "mark" to "space." When the start-stop telegraph signal W*a* including telegraph distortion is applied to the input terminal 01, noise components which are included in the wave W*a* and have considerable high frequency components are eliminated at the low-pass filter 02 having an appropriate cut-off frequency. The telegraph signal W*a* pass through the low-pass filter 02 is then applied to the reshaper 03, in which the telegraph signal W*a* is reshaped to a wave W*b*( including signals 1*a*, 2*a*, 3*a*, 4*a*, 5*a*, 6*a*, 7*a*, 8*a* and 9*a*) by the use of an appropriate threshold level SL. The reshaped wave W*b* is applied to both of the sampler 04 and the start-signal detector 08.

The start-signal detector 08 which is designed so as to detect a start point of "space" polarity of the wave W*b* detects change of state at the characteristic instant 3*a* from the marking stop-signal 1*a* to the spacing-start signal 2*a* and produces a pulse 11 of a wave W*c*. This pulse 11 is applied to the sampling pulse generator 09, which starts its operation to generate a sampling pulse train W*d* and suppresses, through a line 011, detective operation of the detector 08. A first pulse 12 of the sampling pulse train W*d* is produced after being delayed, by one half a duration of standard unit signal of the wave W*a*, from the pulse 11. Sampling pulses 13, 14, 15, 16 . . . are successively generated after the pulse 11 in a period equal to the duration of a standard unit signal. The duration of standard unit signals is equal to 20 milliseconds in a start-stop telegraph signal of 50 Bauds. The sampling pulses 12, 13, 14, . . . are applied to both of the sampler 04 and the counter 010. The counter 010 which is a scale-of-7 counter counts the sampling pulses 12, 13, 14, . . . and generates a carry pulse after counting seven sampling pulses. The carry pulse is applied, through a line 012, to the sampling pulse generator 09 and stops pulse-generation of the sampling pulse generator 09. Accordingly, the number of pulses generated from the generator is equal to seven every detection of a start signal of space polarity. At the same time as the sampling pulse generator 09 stops, the generator 09 releases, through the line 011, said suppression of the operation of the start-signal detector 08.

On the other hand, the sampler 04 samples the polarity of the wave W*b* by the use of the sampling pulses 12, 13, 14, . . . and produces a pulse train W*e*1 and a pulse train W*e*2. In other words, a pulse 12*a* is obtained by sampling the polarity of the signal 2*a* by the use of the pulse 12, and a pulse 13*a* is obtained by sampling the polarity of the alphabetic signal 4*a* by the use of the pulse 13. The successive pulses 14*a*, 15*a*, . . . are obtained by sampling the polarity of the signals 5*a*, 6*a*, . . . by the use of the pulses 14, 15, 16, 17 and 18. In this case, pulses 13*a*, 14*a*, 16*a* an 18*a* correspond to "mark" polarity of the wave W*b* and pulses 12*a*, 15*a* and 17*a* correspond to "space" polarity of the wave W*b*. The pulse trains W*e*1 and W*e*2 are applied to the regenerative register composed of a bistable circuit, which is set by pulses of the pulse train W*e*1 and reset by pulses of the pulse train W*e*2. Accordingly, the output signal W*f* of the register 05 assumes, from mark 19, two states (space 20-mark 21-mark 22-space 23-mark 24-space 25-mark 26) successively by applications of pulses 12*a*, 13*a*, 14*a*, 16*a*, 17*a* and 18*a*.

In accordance with the above-mentioned operation, the sampling pulses 12, 13, 14, 15, 16, 17 and 18 are delayed, by one half the duration (20 milliseconds in case of 50 Bauds) of a standard unit-signal of the wave W*b*, from the respective characteristic instants of the wave W*b*, whereby the sampling pulses 12, 13, 14, 15, 16, 17 and 18 sample respecively, at substantially middle points of the signals 2*a*, 4*a*, 5*a*, 6*a*, 7*a*, 8*a*, and 9*a*. Accordingly, even if the characteristic instants of the wave W*b* are fluctuated in accordance wiht telegraph distortion, the respective sampling pulses 12, 13, 14, 15, 16, 17 and 18 do not detect erroneously polarity of just adjacent signals unless a fluctuated range of each of the characteristic instants exceeds an interval of occurrence times of the sampling pulses which are to be used to sample just adjacent unit-signals. The wave W*f* is a rectangular wave produced from the register 05 and regenerated as a correct telegraph signal without telegraph distortion by the use of the sampling pulses W*d* which have the same interval as to one another. The seventh sampling pulse 18 samples "mark" polarity of the stop-signal 9*a*, thereby obtaining the pulse signal 18*a*.

According to above-mentioned operation, one character of the transmitted telegraph signal W*a* is regenerated. When the stop-signal 26 is regenerated at the output side of the register 05, the scale-of-7 counter 010 produces the carry pulse which controls the pulse generator 09 through the line 012 so as to release, through the line 011, said suppression for the operation of the start-signal detector. In this condition, the regenerative repeater is ready to receive a succeeding new character of the transmitted telegraph signal W*a*. The succeeding characters of the signal W*a* can be received and regenerated by repeating regenerations similar to the above-mentioned operation.

The wave W*f* is converted to an output signal having a desirable value in voltage or current, the output signal being obtainable from the output terminal 07, if necessary, to retransmit it to a transmission medium connected to the output terminal 07.

Operation of the conventional regenerative repeater in which control signals for controlling telegraph switching systems are applied with be described below. There are many kinds of control signals in accordance with types of the telegraph switching systems. In the following, control signals described in C.C.I.T.T. Recommendation U.5 "Requirements To Be Met by Regenerative Repeaters in International Connections" (reference: C.C.I.T.T. Red Book Vol. VII. Telegraph Technique and Data Transmission, page 123–page 125; published by the International Telecommunication Union, March 1961) are adopted by way of example. It is described in the recommendations U.5 that the following five kinds of control signals are to be retransmitted by the regenerative repeaters in international connections.

(1) Sequence signals (involving a single change of polarity).

(2) Call-confirmation (proceed-to-select) signal: A pulse of "stop" polarity of duration from 17.5 milliseconds to 35 milliseconds.

(3) Busy signal.—Pulses of "stop" polarity lasting 200 milliseconds ±30%.

(4) Call-connected signals.—A pulse of "start" polarity lasting 150 ±11 milliseconds.

(5) Dial selection signals.

The above-mentioned control signals (1), (3) and (4) can be regenerated in substantial preciseness by the conventional regenerative telegraph repeater, so that details of their regenerative operations are omitted. In the following, regenerative operations of the recommended control signals (2) and (5) which are erroneously carried out by the conventional regenerative repeater will be described.

Figure 3:
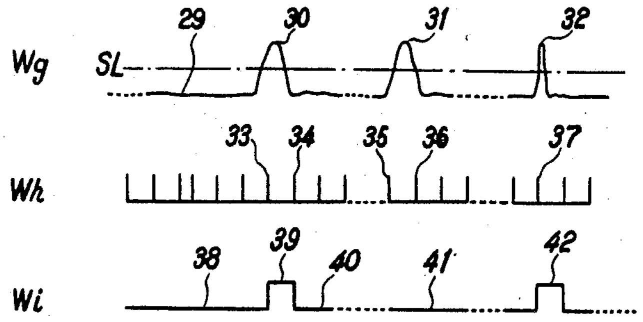

Referring to FIG. 3, erroneous operation of the conventional regenerative repeater to which the control signals (2) are applied is first described. The Wave W*g* is a transmitted control signal (2) including a noise pulse 32 and "mark" pulses 30 and 31 each of which has a duration (17.5 milliseconds) less than the duration (20 milliseconds) of a unit-signal of the start-stop telegraph signal. When a spacing signal 29 lasting a relatively long duration is applied to the start signal detector 08, the detector 08 actuates the sampling pulse generator 09 at every release operation time of this detector 08, so that the sampling pulse generator 09 generates sampling pulses as shown at left side of a wave W*h*. These sampling pulses are employed to sample the wave W*g*, but they are not synchronized with the pulses 30, 31 and 32. In this case, the sampling pulse 33 samples "mark" polarity of the signal 30 and generates a "mark" signal 39 (at the output side of the regenerative register 05 as shown in a wave W*i*); and then the sampling pulse 34 samples a "space" signal of the wave W*g* and generates a "space" signal 40. Accordingly, the signal 30 can be correctly regenerated. However, if a "mark" signal of the signal 31 falls in an interval between sampling pulses 35 and 36 as shown, the signal 31 cannot be correctly sampled by the sampling pulses 35 and 36 and disappears in the wave W*i* as shown by a reference 41. Although the noise pulse 32 which has a duration less than one-half the duration of standard unit-signal has to be eliminated, the noise pulse 32 may be sampled by a sampling pulse, such as a pulse 37, so as to generate a "mark" signal 42 at the output side of the regenerative register 05. As mentioned above, the transmitted control signal wave W*g* is erroneously regenerated by the conventional regenerative telegraph repeater.

Figure 4:
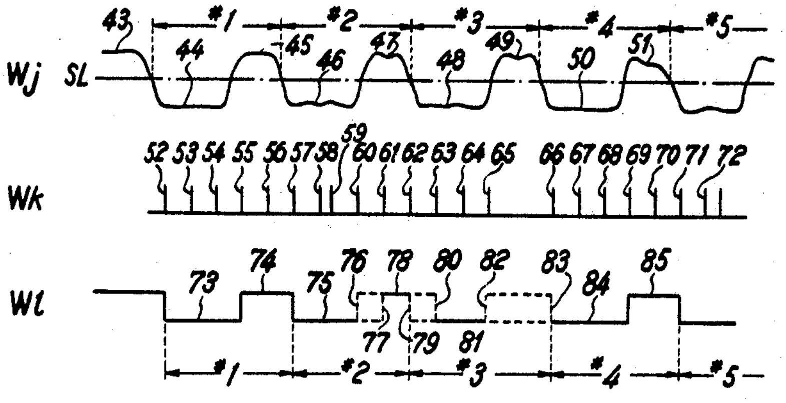

Referring to FIG. 4, erroneous operation of the conventional regenerative repeater to which the control signal (5) (dial selection signals) is applied is described. A wave W*j* indicates transmitted standard dial selection signals which have a dial speed of 10 pulses per second and a space-to-mark pulse ratio 1.5:1. When the state of the wave W*j* changes from a "mark" signal 43 to a "space" signal 44, the sampling pulse generator 09 generates a sampling pulse train W*k*. Generated sampling pulses 52, 53, 54, 55, 56, 57 and 58 sample successively the space signal 44, a mark signal 45 and a space signal 46 so that a space signal 73, a mark signal 74 and a space signal 75 of wave W*l* are regenerated at the output side of the regenerative register 05. At the next release time of the start-signal detector 08, a spacing signal 46 is applied to the detector 08. Accordingly, the detector 08 actuates the sampling pulse generator 09 so as to generate seven sampling pulses 59, 60, 61, 62, 63, 64 and 65. These sampling pulses 59 to 65 sample successively a spacing signal 46, a marking signal 47 and a spacing signal 48. In this case, if the sampling pulses 60 and 62 are respectively timed with a characteristic instant from the signal 46 to the signal 47 and a characteristic instant from the signal 47 to the signal 48, the sampling pulses 60 and 62 sample the spacing signals 46 to 48 or the marking signal 47. Accordingly, the result of sampling the wave W*j* by the sampling pulses 59 to 65 is indefinite; and the output signal W*l* of the regenerative register 05 appears in indefinite state as shown by dotted lines and characteristic instants 76, 77, 79 and 80. A similar condition may occur as to the sampling pulse 65. When the seventh sampling pulse 65 samples a marking signal 49 of the wave W*j*, a characteristic instant 82 occurs at the wave W*j*. But when the sampling pulse 65 samples the spacing signal 48 of the wave W*j*, the characteristic instant 82 does not occur at the wave W*j*. At the same time as counting the pulse 65 by the counter, the sampling pulse generator 09 is stopped its operation by the counter 010, and the start-signal detector 08 is released from its suppression condition. Accordingly, a spacing signal 50 of a succeeding fourth dial pulse #4 is detected by the start-signal detector 08, and the sampling pulse generator 09 generates seven sampling pulses 66, 67, 68, 69, 70, 71 and 72, which sample and correctly regenerate the dial pulse #4 similarly to the operation as to the dial pulse #1. As understood from the abovementioned operations, the dial pulses #2 and #3 may be frequently regenerated in an erroneous condition. Detection operation for dial pulses #4, #5 and #6 is carried out similarly as to the operations for the dial pulses #1, #2 and #3.

As mentioned above, regeneration of control signals has the disadvantage of the following erroneous operations.

(1) The mark signal 31 of the wave W*g* is not regenerated in spite of the requirement that the mark signal 31 is to be regenerated.

(2) The noise pulse 32 of the wave W*g* is regenerated as the marking pulse 42 in spite of the requirement that the noise pulse 32 is to be eliminated.

(3) Dial selection pulses W*j* are affected with telegraph distortion (as described as to the pulse #2) or disappear (as described as to the pulse #3).

In other words, the conventional regenerative telegraph repeater cannot correctly regenerate control signals of telegraph switching systems, such as the recommended control signals (2) and (5).

In order to eliminate such disadvantage of the conventional regenerative repeater, the regenerative telegraph repeater of this invention operates under the following principle.

(1) In case of regenerating the start-stop telegraph signal: The system generates a main sampling pulse train to sample the start-stop telegraph signal when a detector detects a characteristic instant from "mark" (Z) polarity to "space" (A) polarity. The main sampling pulse train is composed of a predetermined number N of sampling pulses which has a period equal to a duration of standard unit-signal of the transmitted telegraph signal. A first pulse of the main sampling pulse train is generated at a time delayed, by one-half the duration of standard unit-signal, from a detected characteristic instant from (Z) polarity to (A) polarity. The predetermined number N is determined in accordance with the number of units of the telegraph signal to be regenerated. The main sampling pulse train is not generated in case of a continuous state of "mark" or "space," since the continuous state has no characteristic instants.

(2) In case of regenerating the control signals of telegraph switching systems:

The system generates a sub-sampling pulse train when a detector detects a characteristic instant from space (A) polarity to mark (Z) polarity. The sub-sampling pulse train is composed of a predetermined number of sampling pulses which has the same period as the main sampling pulse train. A first pulse of the sub-sampling pulse train is generated at a time delayed, by one-half the duration of a standard unit-signal, from said detected characteristic instant from "space" polarity to "mark" polarity. The predetermined number N*a* is an integral number less than the number N. The sub-sampling pulse train is not generated in case of a continuous state of "mark" or "space."

(3) In an interval only where the main sampling pulse or the sub-sampling pulse train is generated, detection operations of both of the first and second detectors are suppressed.

(4) After the interval mentioned just above, a just succeeding characteristic instant is detected, irrespective of mark-to-space or space-to-mark, to generate the corresponding pulse train.

(5) In any case, the main sampling pulse train or the sub-sampling pulse train are not simultaneously generated.

(6) By the use of said sampling pulse train, the transmitted telegraph signals and control signals of the telegraph switching systems are correctly generated at a bistable regenerative register to which sampled information is applied.

Figure 5:
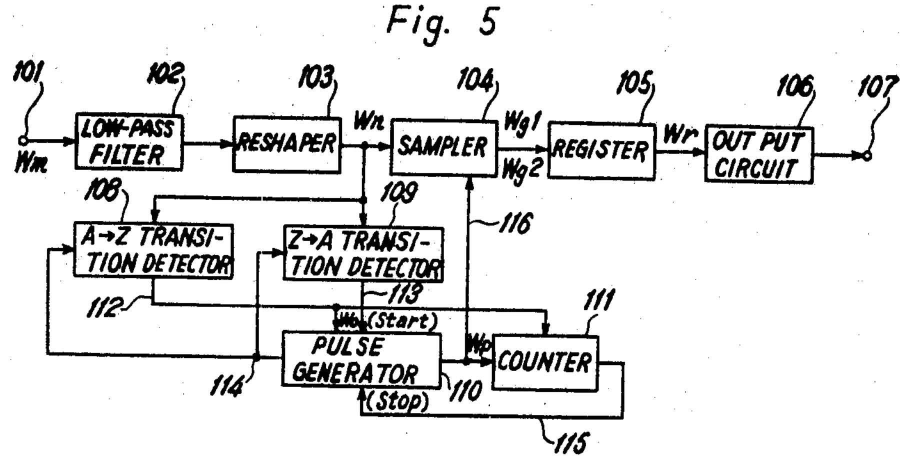
FIG. 5 is a block diagram illustrating an embodiment of the regenerative telegraph repeater of this invention.

In an embodiment of this invention illustrated in FIG. 5, an input terminal 101, a low-pass filter 102, a reshaper 103, a sampler 104, a regenerative register 105, and an output circuit 106, and an output terminal 107 are the same as the respective means of FIG. 1 as designated by corresponding reference numerals. Difference points between the conventional regenerative telegraph repeater (FIG. 1) and the regenerative telegraph repeater of this invention (FIG. 5) are as follows.

(1) While the single detector 08 for detecting "start" of the transmitted telegraph signal is provided in the conventional regenerative telegraph repeater, there are provided, in the regenerative telegraph repeater of this invention, a Z–A transition detector 109 and a A–Z transition detector 108. The detector 109 detects a mark(Z)-to-space(A) "characteristic instant" of a transmitted and reshaped wave. The detector 108 detects a space(A)-to-mark(Z) "characteristic instant" of a transmitted and a reshaped wave. A sampling pulse generator 110 generates sampling pulses under control by either of the detectors 108 and 109. Examples of the detectors 108 and 109 will be described hereinafter.

(2) While the scale of the counter 010 is established at a fixed value (7) in the conventional regenerative telegraph repeater, a scale of a counter 111 of this invention can be switched to two kinds of scales. The values of the scales N and N*a* are determined in accordance with the aforementioned principle of this invention. In this embodiment, however, the scale N and N*a* are established so as to be equal to seven and two respectively to regenerate a 7.5-unit start-stop telegraph signal and said recommended control signals of telegraph switching systems.

Figure 6:
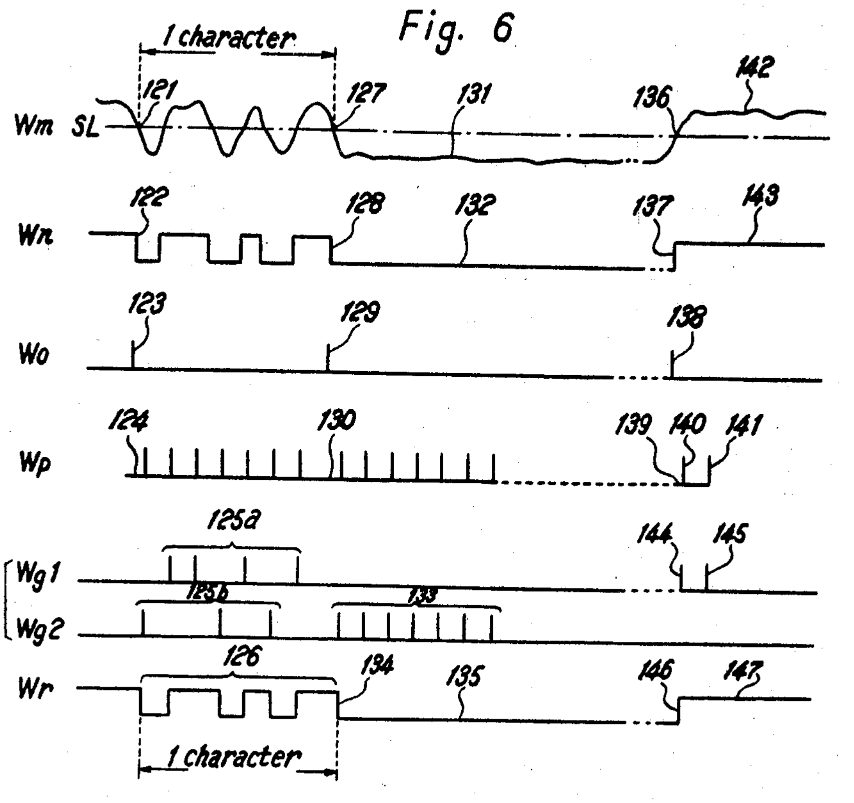
FIGS. 6, 7 and 8 are wave form diagrams for describing operation of the repeater shown in FIG. 5.

Referring to FIG. 6, operation of this embodiment in the case where a start-stop telegraph signal is applied is described. If it is assumed that a telegraph signal W*m* including telegraph distortion is applied to the input terminal 101, noise components which are included in the wave W*m* and have considerable high frequency components are eliminated at the low-pass filter 102 having an appropriate cut-off frequency. The telegraph signal W*m* passed through the low-pass filter 102 is then applied to the reshaper 103, in which telegraph signal W*m* is reshaped into a wave W*n* by the use of an appropriate threshold level LS. The reshaped wave W*n* is applied to the sampler 104 and both of the transition detectors 108 and 109.

A characteristic instant 121 which corresponds to an instant 122 in the wave W*n* is a Z-to-A transition instant. Accordingly, this characteristic instant 121 is detected by Z-to-A transition detector 109, which generates a pulse 123 at its output side as shown in a wave W*o*. This pulse 123 is applied to the sampling pulse generator 110 and actuates the generator 110 so as to generate a (main) sampling pulse train 124. A first pulse of the pulse train 124 occurs at a time delayed, by about one-half the duration of a standard unit-signal, from the occurrence time of the detected pulse signal 123. The succeeding pulses of the pulse train 124 are delayed successively, by the duration of standard unit-signal from the just preceding sampling pulse. In other words, pulses of the pulse train 124 are successively delayed, by successive odd number multiples of one-half the duration of the standard unit-signal of the transmitted telegraph signals W*m*, from the detected characteristic instant 123. In an interval where the sampling pulse generator 110 starts its pulse generation, the generator 110 suppresses detection actions of the detectors 108 and 109.

The generated pulse train 124 is applied to the counter 111, which counts pulses of the pulse train 124. In this case, the value of the scale of the counter 111 is established at "seven" since the characteristic instant 121 (122) is detected by the Z–A transition detector 109. Accordingly, the counter 111 produces a carry pulse when its counting state reaches "seven" and stops said pulse generation of the sampling pulse generator 110 through a line 115. At the same time as the generator 110 is stopped, the sampling pulse generator 110 releases said suppression action against detection actions of the transition detectors 108 and 109. As understood from the above mentioned operation, the pulse train 124 is "a main sampling pulse train," and the detection actions of detectors 108 and 109 are suppresed in an interval only, where the pulse train 124 is generated.

By the use of the pulse train 124 supplied through a line 116, the sampler 104 detects polarity of the reshaped wave W*n* and produces detected pulses **125*a* and 125*b*** as shown in waves *Wg*1 and W*g*2. The regenerative register 105 which is a bistable circuit by way of example regenerates the transmitted telegraph signal W*n* under control of the pulses **125*a* and 125*b*** as shown in a wave W*r*. This wave 126 has no telegraph distortion since the period of the sampling pulses of the pulse train 124 is equal to the duration of standard unit-signal of the transmitted telegraph signal. The regenerated wave W*r* can be derived through the output circuit 106 and the output terminal 107.

In accordance with the above-mentioned operations, one character of the start-stop telegraph signal can be regenerated. If characters of the start-stop telegraph signal are successively applied, they are regenerated by repeating such operation as mentioned above.

The above-mentioned operation against start-stop telegraph signals carried out in the embodiment of this invention is substantially the same as the operation of the conventional repeater except that the characteristic instant 121 (122) is detected by the detector 108 while the "state" of a first space (A) polarity received after release of the detector 08 is detected in the conventional regenerative repeater. In case where control signals other than the start-stop telegraph signals are applied to the repeater of this invention, however, the repeater of this invention acts in different operations from those of the conventional regenerative telegraph repeater.

Referring to middle parts of the wave forms shown in FIG. 6, operation of the embodiment of FIG. 5 in case where a sequence signal of space (A) polarity involving a single change of polarity from mark (Z) to space (A) is applied is described. A Z-to-A characteristic instant 127 of the wave W*m* becomes a characteristic instant 128 after passing through the low-pass filter 102 and the reshaper 103. The instant 128 is detected by the Z-to-A transition detector 109, which produces a pulse 129 of the wave W*o* to start the sampling pulse generator 110. The sampling pulse generator 110 starts by the pulse 129 applied through a line 113 and generates "a main sampling pulse train 130" similarly as described above. This pulse train 130 is applied to the sampler 104, which samples a sequence signal 132 obtained from a sequence signal 131 by the use of the sampling pulse train 130 and produces sampled pulses 133 at its output side. All of the sampled pulses 133 have the same polarity, so that the regenerative register 105 produces at its output side a sequence signal 135 of space (A) polarity which is started from a Z-to-A transition instant 134. When the sampling pulse train 130 of seven pulses is terminated similarly as described above, the transition detectors 108 and 109 are released from suppression action applied from the sampling pulse generator 110. However, since the sequence signal 131 doses not have any transition instants, the transition detectors 108 and 109 do not produce a pulse for starting the sampling pulse generator 110 as long as the sequence signal 131 continues. Accordingly, the sampling pulse generator 110 remains thereafter in its stop condition and the sequence signal 135 lasts in the space (A) polarity. The regenerated sequence signal 135 is derived through the output circuit 106 and the output terminal 107.

Referring to right parts of the wave forms shown in FIG. 6, operation of the embodiment of FIG. 5 in the case where a sequence signal 142 of mark (Z) polarity after a single change of polarity at an instant 136 from space (A) to mark (Z) is applied is described. The A-to-Z characteristic instant 136 of the wave W*m* becomes a characteristic instant 137 after passing through the low-pass filter 102 and the reshaper 103. The instant 137 which is an A-to-Z characteristic instant is detected by the A-to-Z transition detector 108, which produces a pulse 138 of the wave W*o*. This pulse 138 is applied, through a line 112, to both the sampling pulse generator 110 and the counter 111. The sampling pulse generator starts to generate a pulse train 139 after receiving the pulse 138 similarly as described above. When the pulse 138 is applied to the counter 111, the scale of the counter 111 is switched so as to be equal to "two." Accordingly, at a time when the counter 111 has counted two pulses 140 and 141 from the sampling pulse generator 110, the counter 111 produces a carry pulse which stops pulse generation of the generator 110 through the line 115. In accordance with said co-operation of the sampling pulse generator 110 and the counter 111, the sampling pulse generator 110 generates "a sub-sampling pulse train 139" composed of two pulses 140 and 141 which have the same period as "the main sampling pulse train" (124 or 130). A first pulse 140 is generated at a time delayed, by about one-half the duration of a standard unit-signal, from an occurrence time of the detection pulse 138. When the sub-sampling pulse train 139 of two pulses is terminated, the transition detectors 108 and 109 are released from suppression action applied from the sampling pulse generator 110. However, since the sequence signal 142 does not have any transition instants, the transition detectors 108 and 109 do not produce a pulse for starting the sampling pulse generator 110 as long as the sequence signal 142 continues.

The generated sub-sampling pulse train 139 is applied to the sampler 104, which samples a sequence signal 143 obtained from the sequence signal 142 by the use of the sub-sampling pulse train 139 and produces sampled pulses 144 and 145 at its output side. Both of the sampled pulses 133 have the same polarity, so that the regenerative register 105 produces at its output side a sequence signal 147 of mark (Z) polarity which is started from a Z-to-A transition instant 146. The regenerated sequence signal 147 is derived through the output circuit 106 and the output terminal 107.

In summary, when the sequence signal of space (A) polarity or mark (Z) polarity involving a single change of polarity from Z-to-A or A-to-Z is received, the sampling pulse generator 110 of this invention generates the main or sub-sampling pulse train at only an initial short interval after the change of polarity, while the sampling pulse generator 09 of the conventional regenerative telegraph repeater generates said sequential sampling pulse train as shown by the wave W*h* in FIG. 3. The main sampling pulse train is generated after a Z-to-A transition instant and the sub-sampling pulse train is generated after an A-to-Z transition instant. These principles are important features of the regenerative telegraph repeater of this invention. In the following, correct regeneration of said recommended control signals (2) and (5) carried out by the embodiment of this invention will be described.

Figure 7:
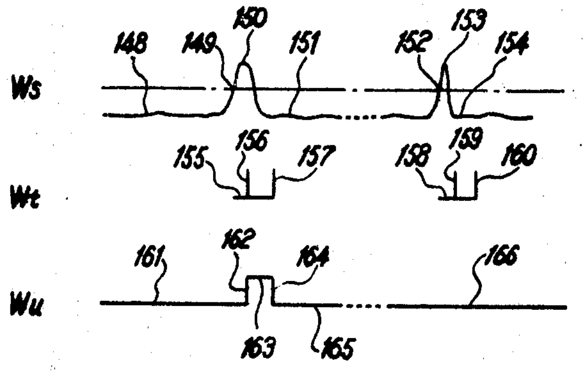

Referring to FIG. 7, regeneration of a pulse signal of mark (Z) polarity which has a duration 17.5 milliseconds (slightly less than the standard duration of 20 milliseconds of a unit-signal of a 50 Bauds start-stop telegraph signal) and elimination of a noise of mark (Z) polarity which has a duration less than one-half the standard duration of 20 milliseconds are described. In an interval where a sequence signal 148 of space (A) polarity (shown in a wave W*s*) is applied, the sampling pulse generator 110 is stopped as mentioned above. When a transition instant 149 is received, the instant 149 is detected by the A–Z transition detector 108, which causes the sampling pulse generator 110 to generate a sub-sampling pulse train 155 shown in a wave W*t*. Two pulses 156 and 157 of the sampling pulse train 155 are applied to the sampler 104, in which the pulse 156 samples a pulse 150 of mark (Z) polarity and the pulse 157 samples a signal 151 of space (A) polarity. Sampled pulse signals are applied to the regenerative registor 105, which produces, at its output side, a regenerated wave W*n* composed of a sequence signal 161 of space (A) polarity, an A-to-Z transition (instant) 162, a signal 163 of mark (Z) polarity, a Z-to-A transition (instant) 164 and a sequence signal 165 of space (A) polarity. In accordance with above operation, the pulse signal 150 of mark (Z) polarity is correctly detected. In particular, the regenerated pulse signal 163 has telegraph distortion $(20-17.5)/17.5\times100\%$ ($\doteqdot15\%$), but this value 15% of the telegraph distortion is included in the range of allowable margin for telegraph switching systems to correctly detect such mark pulse lasting a duration of 17.5 milliseconds.

Next, when a noise pulse 153 having a duration less than one-half the duration of a standard unit-signal is received, a transition instant 152 is detected by the A-to-Z transition detector 108, which causes the sampling pulse generator to generate a sub-sampling pulse train 158 which is composed of two pulses 159 and 160. The sampling pulse train 158 is applied to the sampler 109, in which the pulses 159 and 160 sample the noise pulse 153. However, since the duration of the noise pulse 153 is less than one-half the duration of a standard unit-signal and the first pulse 159 occurs at a time delayed, by one-half the duration of a standard unit-signal, from the transition instant 152, both of the sampling pulses 159 and 160 sample a signal 154 of space (A) polarity. Accordingly, the noise pulse 153 of mark (Z) polarity is eliminated at the output side of the regenerative register 105 as shown by a reference 166 designated in the wave W*n*.

Figure 8:
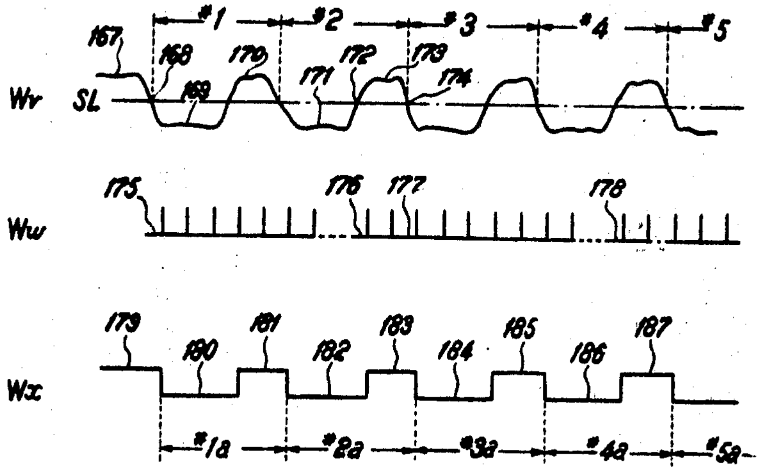

Referring to FIG. 8, operation of the embodiment of this invention shown in FIG. 5 to which the recommended dial selection signals #1, #2, #3, #4, #5, . . . (shown in a wave Wv) are applied is described. In a period where a sequence signal 167 of mark (Z) polarity is received, the sampling pulse train is not generated as described above and the output side of the regenerative register 105 has been maintained at the mark (Z) polarity. When a Z-to-A characteristic instant 108 is received, the Z-to-A transition detector 109 detects the transition instant 168 and causes the sampling pulses generator 110 to generate a main sampling pulse train 175 shown in a wave Ww. The sampling pulse train 175 is applied to the sampler 104, in which pulses of the sampling pulse train 175 sample signals 169 and 170 of space (A) polarity and a signal 170 of mark (Z) polarity. Detection of polarity of these signals 169, 170 and 171 is correctly carried out as understood by the time charts of the waves Wv and Ww. Sampled signals are applied to the regenerative register 105, which regenerates at the output side thereof a space (A)-signal 180, a mark (Z)-signal 181 and a space (A)-signal 182. In this operation, the first dial selection signal #1 and a part of the second dial selection signal #2 are correctly regenerated.

After the transition of the main sampling pulse train 175, the output state of the regenerative register 105 has been maintained at the space (A) polarity of the regenerated signal 182. When an A-to-Z characteristic instant 172 of the second dial selection signal #2 is received, the A-to-Z transition detector 109 detects the transition instant 172 and causes the sampling pulse generator to generate a sub-sampling pulse train 176. This sub-sampling pulse train 176 is applied to the sampler 104, in which two pulses of the pulse train 176 sample a signal 173 of mark (Z) polarity. Sampled signals are applied to the regenerative register 105, and a signal 183 of mark (Z) polarity (shown in the wave Wx) is regenerated at the output side of the regenerative register 105. After the termination of the sub-sampling pulse train, the output state of the regenerated register 105 is maintained at the mark (Z) polarity of the signal 183.

Next, successive dial section signals #3, #4, #5, . . . are received after a Z-to-A characteristic instant 174. These signals #3, #4, #5, . . . are correctly sampled and regenerated by the use of main sampling pulse trains and sub-sampling pulse trains which are alternately generated as shown by references 177 and 178. These operations are similar to the operation as to the dial selection pulses #1 and #2. In accordance with the above-mentioned operation, all the dial selection pulses #1, #2, #3, . . . are correctly detected and regenerated at the output side of the regenerative register 105. Regenerated dial selection pulses can be derived through the output circuit 106 and the output terminal 107.

Figure 9:
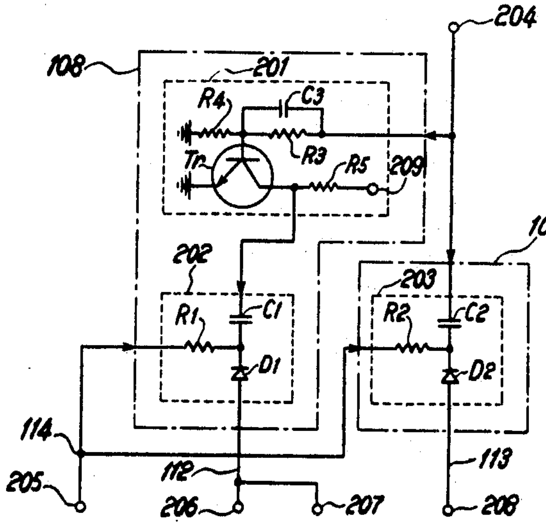
FIG. 9 is a connection diagram illustrating examples of transition detectors employed in the present invention.

Referring to FIG. 9, an example of a connection diagram for the A–Z transition detector 108 and the Z–A transition detector 109 in accordance with the present invention is described. The A–Z transition detector 108 shown by chain line is composed of an inverter 201 and a circuit 202 as shown by dotted lines. The Z–A transition detector 109 is composed of a circuit 203. A terminal 203 is connected to the output side of the reshaper 103. A terminal 205 is connected, through the line 114 to the sampling pulse generator 110 to receive said suppression action. Terminals 206 and 207 are connected, through the line 112, to the sampling pulse generator 110 and the counter 111. A terminal 208 is connected, through the line 113, to the sampling pulse generator 110. The inverter 201 is composed of bleeder resistances R3 and R4, a bi-pass capacitor C3, a transistor Tr, and a collector resistance R5. A terminal 209 is connected to a D.C. source. As readily understood, polarity of an input signal of the invertor 201 is inverted at its output side. Said circuits 202 and 203 have the same formation as to each other and are each composed of a differentiation capacitor C1 or C2, a gating diode D1 or D2, and a bias resistance R1 and R2. The capacitor (C1 or C2) and the diode (D1 or D2) are connected in series with each other and the resistor (R1 or R2) is connected to the junction point between the capacitor (C1 or C2) and the diode (D1 or D2). Through the line 114, a suppression signal which has two states of zero potential and a positive level is applied. In this case, the zero potential and the positive level correspond respectively to "non-suppression" and "suppression."

Operation of this example is as follows. If a Z–A transition instant is received at the terminal 204, the capacitor C2 generates a pulse signal P− of negative polarity and the capacitor C1 generates a pulse signal P+ of positive polarity. Accordingly, when the suppression signal is of zero potential, only the pulse signal P− can be passed through the diode D2 and supplied to the line 113. The positive pulse P+ is stopped at the diode D1. On the contrary, when an A–Z transition instant is received at the terminal 204, the capacitor C1 generates a pulse signal P− of negative polarity which can be passed through the diode D1. At this time, the capacitor C2 generates a pulse signal P+ of positive polarity which cannot be passed through the diode D2. As mentioned above, if the appropriate positive level is applied through the line 114 to resistor R1 and R2 as a "suppression signal," a negative pulse P− cannot be passed through the circuits 202 and 203. As mentioned above, the circuits 108 and 109 operate respectively as said "A–Z transition detector" and "Z–A transition detector."

By way of another example (not shown in the figures), said detectors 108 and 109 can be formed respectively as a combination I and a combination II each using an inverter and an AND gate circuit. In combination I, the reshaped wave (Wn) is applied (without the inverter) to the AND gate circuit, and the regenerated wave (Wr) is applied through the inverter to the gate circuit. In combination II, however, the reshaped wave (Wn) is applied through the inverter to the AND gate circuit and the regenerated wave (Wr) is applied (without the inverter) to the gate circuit. In both of the combinations I and II, the AND gate circuit does not generate its output signal in case of receiving a "mark" or "space" sequence signal since two inputs of the respective AND gate circuits have different polarities from each other as the result of such formation and connection. But, if a Z-to-A transition instant is received, the AND gate circuit of the combination I generates its output pulse since the two inputs of this gate circuit are of positive polarity. In this case, the AND gate circuit of the combination II does not generate its output since the two inputs of this gate circuit are of negative polarity. On the contrary, when an A-to-Z transition instant is received, the AND gate circuit of the combination II generates its output while the AND gate circuit of the combination I does not generate its output. Accordingly, the combination I and the combination II can be employed as the A-to-Z transition detector 108 and the Z-to-A transition detector 109 respectively. In the above description, it is assumed that the AND gate circuit passes therethrough signals of positive polarity. Accordingly, if the AND gate circuit passes therethrough signals of negative polarity, the combination I and the combination II correspond respectively the detectors 109 and 108.

Figure 10:
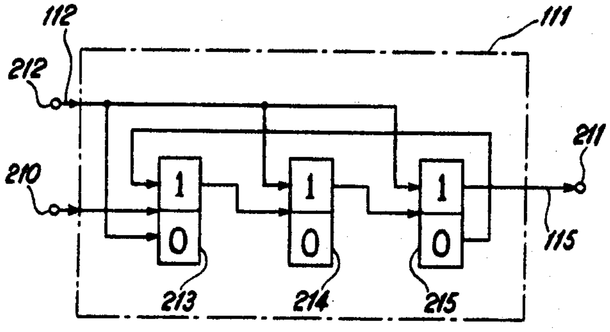
FIGS. 10 and 11 are block diagrams illustrating examples of counters employed in the present invention.

Referring to FIG. 10, an example of the switchable counter 110 is described. In this connection diagram, a terminal 210 is connected to the sampling pulse generator 110 to receive pulses of the sampling pulse train and a terminal 211 is connected to the sampling pulse generator 110 through a line 115 to stop it. A switching signal for switching a scale of counter 111 (hereinafter referred as "a switching pulse signal") is applied to the terminal 212 through the line 112. The counter 111 of this example is composed of binary counters 213, 214 and 215. A carry output of a just preceding stage is applied to a bistable input of the just succeeding stage. A "0" output of the bistable counter 215 is fed back to a "1" input of the binary counter 213. The line 112 is connected to a "0" input of the binary counter 213 and "1" inputs of the binary counters 214 and 215. As a result of said formation, the binary counter operates as a scale-of-7 counter. The counting states of this counter are as shown in Table 1.

TABLE 1

| | Decimal number/ binary counter | | |
|---|---|---|---|
| | 215 | 214 | 213 |
| 0(7) | 0 | 0 | 0 |
| 1 | 0 | 0 | 1 |
| 2 | 0 | 1 | 0 |
| 3 | 0 | 1 | 1 |
| 4 | 1 | 0 | 1 |
| 5 | 1 | 1 | 0 |
| 6 | 1 | 1 | 1 |

Accordingly, when the counter 111 is initially set to a state "000," a carry output from the terminal 211 is produced when seven pulses are applied to the terminal 210. On the contrary, when said switching pulse signal is applied to the line 112, the counter 111 is initially set to a state "110." In this case, a carry output is produced when two pulses are applied to the terminal 210. As mentioned above, the scale of the counter 111 can be switched to "seven" or "two."

Figure 11:
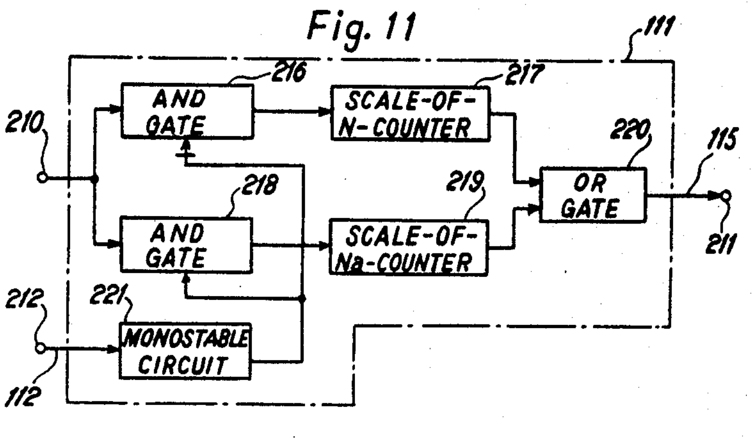

FIG. 11 shows another example of the counter 111, which comprises a scale-of-N counter 217, a scale-of-N*a* counter 219, AND gate circuits 216 and 218, an OR gate circuit 220, and a monostable circuit 221. Terminals 210, 211 and 212 are the same as those of FIG. 10. In this example, the monostable circuit 221 generates an output pulse which has a duration substantially equal to the generation duration of said sub-sampling pulse train only when a switching pulse signal is applied to the line 112. Accordingly, pulses of the main and sub-sampling pulse trains are passed through the gate circuit 216 or 218 in accordance with non-application or application of the switching pulse signal to the line 112. As understood from the above description, the scale of the counter 111 can be switched to "N" or "N*a*."

Since it is obvious that many changes and modifications without departing from the nature and spirit of the invention, it is to be understood that the invention is not to be limited to the details described herein.

What we claim is:

1. A regenerative telegraph repeater for regenerating transmitted telegraph signals and transmitted control signals of telegraph switching systems; comprising the combination of a first detector for detecting a mark (Z)-to-space (A) characteristic instant of a transmitted signal; a second detector for detecting a space (A)-to-mark (Z) characteristic instant of the transmitted signal; a sampling pulse generator for generating a sampling pulse train when the first detector or the second detector detects said characteristics instants, the pulse train being composed of sampling pulses which are successively delayed, by successive odd number multiples of one-half the duration of a standard unit-signal of the transmitted telegraph signals, from the detected characteristic instant; suppression means for suppressing detection operations of both of the first and second detectors throughout the interval only in which the pulse train is generated; counting means which counts the number of sampling pulses and produces a carry pulse when the counting state thereof reaches a predetermined value; means for stopping pulse generation of the sampling means when the counting means produces the carry pulse; means for switching the scale of the counting means so that the value of the scale is equal to N units of the transmitted telegraph signals in the case of said detection of a Z-to-(A) characteristic instant carried out by the first detector and is equal to N*a* units in the case of said detection of an (A)-to-(Z) characteristic instant carried out by the second detector, the number N*a* being an integral number less than the number N; a sampler for sampling the transmitted telegraph signal by the use of the sampling pulse train; and a bistable circuit set by a mark (Z) polarity pulse sampled by the sampler and reset by a space (A) polarity pulse sampled by the sampler.

2. A regenerative telegraph repeater according to claim 1, in which the number N is equal to seven and the number N*a* is equal to two, whereby the repeater can regenerate a start-stop telegraph signal and control signals for telegraph switching systems.

3. A regenerative telegraph repeater according to claim 1, in which the first detector comprises a differentiation circuit and a rectifying circuit connected in a cascade arrangement, and the second detector comprises a inverter, a differentiation circuit and a rectifying circuit connected in a cascade arrangement.

4. A regenerative telegraph repeater according to claim 3, in which the differentiation circuit and the rectifying circuit of each of the detectors comprises a capacitor and a rectifying element connected in series, a suppression signal from the suppression means being applied to the connection junction between the capacitor and the rectifying element.

5. A regenerative telegraph repeater according to claim 1, in which the first detector is composed of a combination circuit I and the second detector is composed of a combination circuit II, each of the combination circuits I and II comprising an inverter and an AND gate circuit, a reshaped transmitted telegraph signal being applied to the AND gate circuit of the combination circuit I and applied, through the inverter, to the AND gate circuit of the combination circuit II, the output signal of the bistable circuit being applied, through the inverter, to the AND gate circuit of the combination circuit I and applied to the AND gate circuit of the combination circuit II.

6. A regenerative telegraph repeater according to claim 2, in which the counting means comprises a scale-of-7 counter which is initially reset to a state "000" except when the first detector detects a Z-to-A charatceristic instant and is initially reset to a state "110" when the second detector detects an A-to-Z characteristic instant.

7. A regenerative telegraph repeater according to claim 1, is which the counting means comprises a scale-of-N counter, a scale-of-N*a* counter, two AND gate circuits respectively employed for passing said sampling pulses from the sampling pulse generator, and a monostable circuit which closes the AND gate circuit for the scale-of-N counter and opens the AND gate circuit for the scale-of-N*a* counter except when the second detector detects an A-to-Z characteristic instant, the monostable circuit opening the AND gate circuit for the scale-of-N counter and closing the AND gate circuit for the scale-of-N*a* counter when the second detector detects an A-to-Z characteristic instant, a closing duration of the AND gate circuit for the scale-of-N*a* counter being established so as to be substantially equal to generation duration of a number N*a* of said sampling pulses.

References Cited

UNITED STATES PATENTS

| | | | |
|---|---|---|---|
| 2,685,613 | 8/1954 | Liguori | 328—164 |
| 3,071,733 | 1/1963 | Holzer et al. | 178—70 |
| 3,110,768 | 11/1963 | Pustelnyk | 328—164 |
| 3,396,239 | 8/1968 | Yamauchi | 178—70 |

THOMAS A. ROBINSON, Primary Examiner

M. M. CURTIS, Assistant Examiner

U.S. Cl. X.R.

328—164